US012480711B1

(12) United States Patent
Rea

(10) Patent No.: US 12,480,711 B1
(45) Date of Patent: Nov. 25, 2025

(54) HALF-CRUCIBLE DRY HEARTH MELTER

(71) Applicant: Eric Rea, Seffner, FL (US)

(72) Inventor: Eric Rea, Seffner, FL (US)

( * ) Notice: Subject to any disclaimer, the term of this patent is extended or adjusted under 35 U.S.C. 154(b) by 0 days.

(21) Appl. No.: 19/066,351

(22) Filed: Feb. 28, 2025

(51) Int. Cl.
*F27B 14/06* (2006.01)
*F27B 14/02* (2006.01)
*F27B 14/12* (2006.01)
*F27B 14/08* (2006.01)

(52) U.S. Cl.
CPC ............ *F27B 14/061* (2013.01); *F27B 14/02* (2013.01); *F27B 14/12* (2013.01); *F27B 2014/0818* (2013.01); *F27B 2014/0825* (2013.01)

(58) Field of Classification Search
CPC ........ F27B 14/02; F27B 14/061; F27B 14/08; F27B 14/0806; F27B 14/0818; F27B 14/0825; F27B 14/0843; F27B 14/10; F27B 14/102; F27B 14/104; F27B 14/12; F27B 14/14; F27B 14/20; F27B 2014/0818; F27B 2014/0825; F27B 2014/0831
See application file for complete search history.

(56) References Cited

U.S. PATENT DOCUMENTS 4,238,635 A * 12/1980 Saarivirta ................. F27D 1/00 373/130
4,405,351 A * 9/1983 Sheinkop ................. C03B 5/24 65/29.21
5,835,525 A * 11/1998 Thomas .................. F27B 14/06 373/122
2006/0193366 A1* 8/2006 Emami .................... H05B 3/62 373/117
2008/0202644 A1 8/2008 Grassi et al.
2011/0158887 A1* 6/2011 Stoddard ................. C30B 29/06 432/2

FOREIGN PATENT DOCUMENTS

CN 204454860 U * 7/2015

* cited by examiner

*Primary Examiner* — Hung D Nguyen
(74) *Attorney, Agent, or Firm* — Andrew Behrens; Trenam Law

(57) ABSTRACT

The present invention relates to an electric dry hearth melter furnace designed for efficient and controlled metal melting. The furnace features a half-crucible chamber with an embedded heating element, ensuring direct heat transfer for improved energy efficiency. A refractory cover and insulation minimize heat loss, while a discharge outlet with an integrated filter reduces slag contamination. Adjustable support legs and an automated tilting mechanism facilitate controlled metal flow. A thermocouple and power control system regulate temperature, optimizing performance. The furnace's batch-loading system eliminates repeated heat cycling, enhancing metal purity and reducing oxidation. Its modular design accommodates various foundry scales, providing a cost-effective and safer alternative to conventional gas-fired and continuous melting systems. The invention offers precise temperature control, reduced operational costs, and an improved melting process, making it ideal for small to mid-sized foundries seeking efficient metal processing solutions.

11 Claims, 6 Drawing Sheets

HALF-CRUCIBLE DRY HEARTH MELTER

BACKGROUND OF THE INVENTION

1. Field of the Invention

This invention relates, generally, to metal melting and casting. More specifically, it relates to single-chamber furnaces.

2. Brief Description of the Prior Art

Modern metal and casting processes rely on a variety of furnace designs, including crucible furnaces, gas-fired dry hearth melters, and large-scale continuous melting systems. Most conventional setups use a crucible, where the metal charge is placed inside a container and heated indirectly from an energy source. Gas and oil-fired furnaces dominate the industry, providing large-scale melting capacity but often at the cost of energy waste, high operational expenses, and safety risks. Additionally, many foundries use continuous or incremental loading, meaning the charge is added gradually, causing repeated heat cycling. This process contributes to excessive oxidation and slag formation which contaminates the molten metal and reduces the overall material quality.

Conventional furnaces have significant drawbacks which limit their efficiency, affordability, and usability, especially for small-scale foundries. The indirect heating of crucible furnaces creates substantial heat loss. This reduces energy efficiency and requires longer melting times. This leaves small-scale foundries facing significant monetary costs for inefficient and poorly performing furnaces.

Gas-fired systems are capable of handling large volumes and operate continuously, however, they consume fuel while not actively melting metal charge. Gas-fired furnaces also suffer from oxidation skin, or slag, particularly in setups whether the metal charge is added incrementally. Each time the furnace is opened to introduce new material, exposure to air accelerates oxidation which leads to increased slag contamination. These traditional designs create safety hazards as well for operators such as splashing molten metal during loading and pouring.

There is a growing need for a more efficient, cost-effective, and safer melting solution which minimizes heat and energy loss, reduces oxidation contamination, and provides scalable designs for different foundry sizes. Small and mid-sized metalworking businesses require an affordable alternative which does not rely on continuous fuel consumption or complex, high-maintenance systems. A furnace that eliminates the need for frequent heat cycling would significantly improve the quality of molten metal charge while reducing material waste.

Moreover, a simplified design which enhances safety and ease of operation would make metal melting more accessible to independent foundries. In an industry where manufacturing costs continue to rise, and efficiency is prioritized, a furnace that operates only when needed and offers precise and controlled melting would significantly improve the industry.

Currently, there is a lack of a melting furnace with a unique heating and batch-loading system that places a hot wire heating element in direct exposure to the charge within the furnace to ensure efficient heat transfer. A batch-loading system would eliminate the need for continuous opening and closing of the furnace, therefore minimizing exposure to environmental air. This would significantly reduce the formation of oxidation skin, or slag. Additionally, a furnace powered only during active melting would reduce unnecessary energy use, making the entire process more cost effective than traditional gas-fired or continuously running electric furnaces.

The size and capacity of such a furnace could be scaled up by increasing the chamber's diameter or length, allowing for customization based on production needs. It also would allow simple and effective construction methods to allow for easy and cheap production costs, making it a viable solution for small businesses.

Accordingly, what is needed is an improved furnace design. However, in view of art, considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to an electric dry hearth melter furnace. In some embodiments, the apparatus may comprise a chamber having a top section and a bottom section.

In some embodiments the chamber comprises a half crucible disposed along the bottom section of the chamber. Moreover, the chamber may include a refractory cover superposed on at least one portion of the half crucible. The chamber may comprise a liner disposed along the top surface of the half crucible Additionally, in some embodiments, the chamber includes an electrical heating element such that at least one portion of the electrical heating element is exposed. The chamber may further comprise a discharge outlet at the front end of the chamber as well as a filter operably coupled to the top and bottom sections of the chamber, positioned between a charge within the chamber and the discharge outlet. Furthermore, the chamber may include a viewing cover disposed above the filter and operably coupled to the top section of the chamber.

In some embodiments, the melting furnace may comprise one or more support legs mechanically coupled to the half crucible. Additionally, the melting furnace may further include an insulation material affixed to the top and bottom sections of the chamber. Furthermore, a cover overlaid over an outer surface of the insulation material may comprise a component of the melting furnace. Furthermore, in some embodiments, the melting furnace comprises a temperature sensor that may extend through the refractory cover, insulation layer, and cover.

In some embodiments, the discharge outlet may be operably coupled to an external casting system. Moreover, in some embodiments, the melting furnace may further comprise a flow control valve that may be operably coupled to the discharge outlet.

In some embodiments, the melting furnace may further comprise a power control system that may be operably connected to the heating element such that the power control system may regulate an electrical input.

Moreover, in some other embodiments, the one or more support legs may be adjustable wherein the at least one of the one or more legs may be raised to a greater height than at least one other of the one or more legs creating an angle between the one or more legs. Additionally, in some embodiments, an automated tilting mechanism may be operably coupled to the one or more support legs such that the angle of the chamber can be adjusted to control the flow of molten metal through the discharge outlet. Furthermore, in some embodiments, the angle between the one or more legs may comprise an angle of at least 0.5 degrees.

Moreover, another aspect of the present disclosure pertains to an apparatus for melting metal charges. In an embodiment, the apparatus may comprise a chamber having a top section and a bottom section. In some embodiments, the chamber comprises a half crucible disposed along the bottom section of the chamber; (ii) a heating element wherein at least one portion of the heating element is exposed and at least one other portion of the heating element is embedded within the half crucible. Moreover, in some embodiments, the melting furnace comprises a discharge outlet at the front end of the chamber. Additionally, melting furnace may include a temperature sensor extending away from the back end of the chamber to the exterior as well as one or more support legs that may be mechanically coupled to the half crucible.

In some embodiments, the melting furnace may further comprise a refractory cover superposed on at least a portion of the half crucible, the refractory cover disposed along the top section of the chamber. In some embodiments, the melting furnace may comprise comprising a liner disposed along at least a portion of the half crucible.

Moreover, in some embodiments, the melting furnace may have a filter operably coupled to the top and bottom sections of the chamber between a charge within the chamber and the discharge outlet. Additionally, in some embodiments, the melting furnace further comprises a viewing cover that may be operably coupled to the top section of the front end.

In some embodiments, the melting furnace may include an insulation material enwrapped around at least a portion of the chamber to minimize heat loss. Additionally, the melting furnace may further comprise a cover overlaid over the insulation material.

In some embodiments, the melting furnace may further comprise a power control system that may be operably connected to the heating element wherein the power control system may regulate the electrical input. In some embodiments, the one or more support legs may be adjustable wherein the at least one of the one or more legs may be raised to a greater height than at least one other of the one or more legs thereby creating a downward angle towards the discharge outlet.

Furthermore, an additional aspect of the present disclosure pertains to a method of melting a metal charge. In an embodiment the method may comprise the following steps: (a) providing a metal furnace for melting a metal charge, the metal furnace comprising: (i) a chamber having a top section and a bottom section, the chamber comprising: (1) a half crucible; (2) a heating element, wherein at least one portion of the heating element is exposed and at least one portion of the heating element is embedded within the half crucible; (3) a discharge outlet at the front end of the chamber; and (4) a temperature sensor extending away from the back end of the chamber to the exterior; (ii) one or more support legs mechanically coupled to the half crucible; (b) placing a metal charge on a top surface of the half crucible within the chamber; (c) electrically charging the heating element to melt the metal charge; and/or (d) directing molten metal through the discharge outlet.

In some embodiments the method may further comprise the step of, monitoring the temperature within the chamber via the thermocouple. Furthermore, in some embodiments, the method may also comprise the step of, filtering impurities from the molten metal charge via a filter positioned between the charge and the discharge outlet. Additionally, in some embodiments, the method may further comprise the step of, adjusting the angle of the chamber via an automated tilting mechanism.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
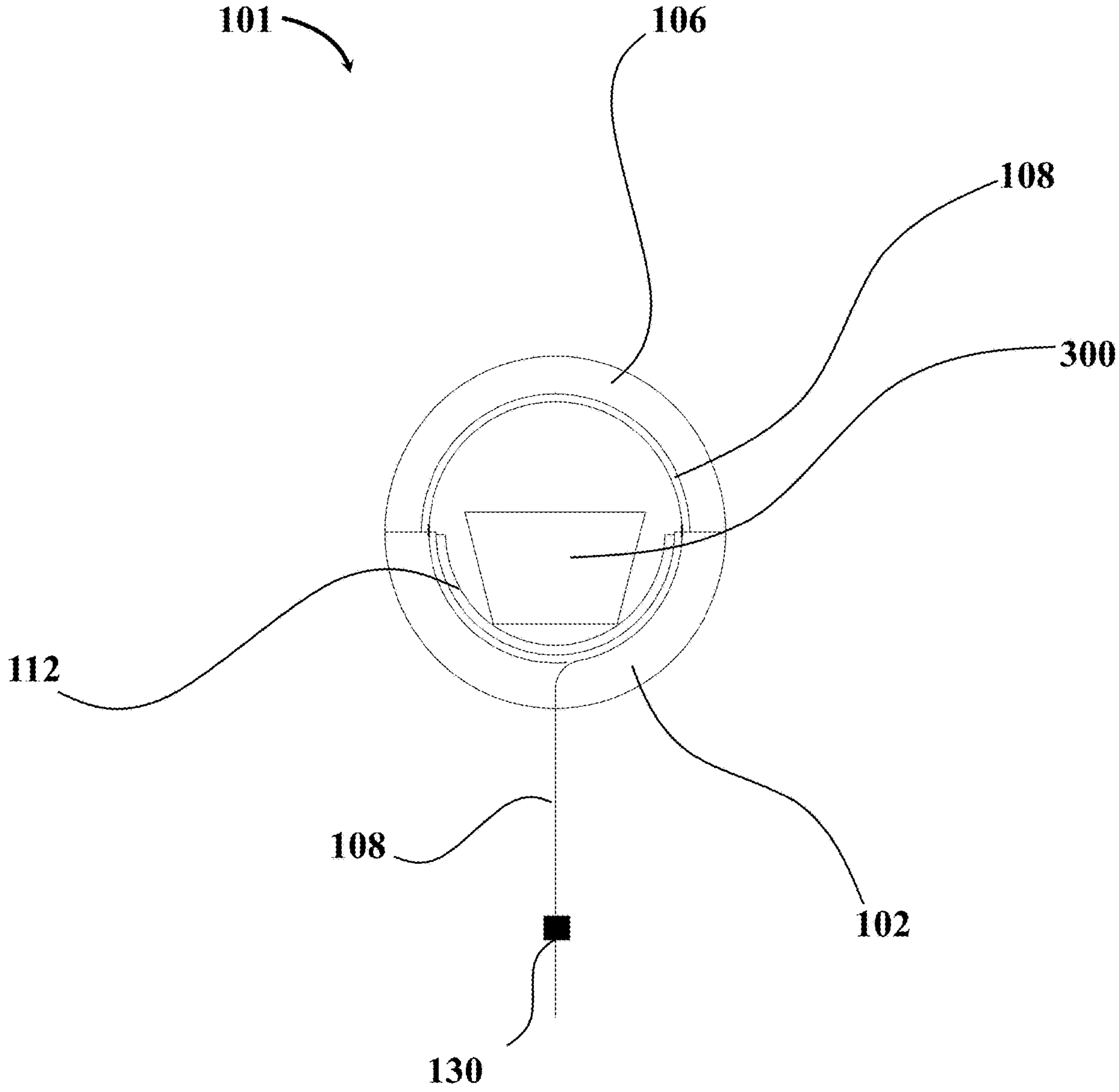
FIG. 1 is a graphical illustration depicting a front-view of a chamber of a melting furnace with a charge placed within the chamber, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

As used herein, the term "communicatively coupled" refers to any coupling mechanism known in the art, such that at least one electrical signal may be transmitted between one device and one alternative device. Communicatively coupled may refer to Wi-Fi, Bluetooth, wired connections, wireless connection, and/or magnets. For ease of reference, the exemplary embodiment described herein refers to Wi-Fi and/or Bluetooth, but this description should not be interpreted as exclusionary of other electrical coupling mechanisms.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system) (e.g., the degree of precision required for a particular purpose, such as packaging and/or delivery of at least one prosthesis and/or prosthetic implant into a surgical pocket). As used herein, "about," "approximately," or "roughly" refer to within +25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about." It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Invention Apparatus/System/Method (e.g., Disinfection Apparatus)

The present disclosure pertains to an improved electric dry hearth melter furnace (hereinafter, "melting furnace") designed with a half-crucible chamber which can be implemented for small-scale foundries to large-scale industrial sized factories. The melting furnace utilizes a hot wire (hereinafter, "heating element") for heating and thereby allowing for a direct heating system such that less energy is spent and quickens the melting process of a desired metal material (hereinafter, "charge"). Additionally, the melting furnace reduces the amount of contamination of oxidation skin (i.e., "slag") into the desired molten metal as it flows outside the melting furnace towards an outside casting system.

In some embodiments, the melting furnace includes a chamber having a top section and a bottom section. Moreover, the half-crucible is disposed along the bottom section of the chamber whereas a refractory cover is superposed on at least one portion of the half crucible. In this manner, the refractory cover is disposed along the top section of the chamber.

Furthermore, in some embodiments, the chamber includes a heating element which comprises a coil structure disposed throughout the chamber such that the upper portion of the heating element is exposed within the top section of the chamber. In contrast, the lower portion of the heating element is embedded within the half crucible. Additionally, the chamber further comprises a discharge outlet located towards the front end of the chamber where a filter is disposed between a charge located within the chamber and the discharge outlet.

Returning to the melting furnace, in some embodiments, the melting furnace comprises one or more support legs mechanically coupled to the half-crucible of the chamber. Moreover, the melting furnace includes an insulation material that enwraps the chamber as well as a cover which is overlayed over the insulation material. Finally, in some embodiments, the melting furnace comprises a thermocouple that extends from within the chamber through the insulation and cover into the outside environment.

Figure 2:
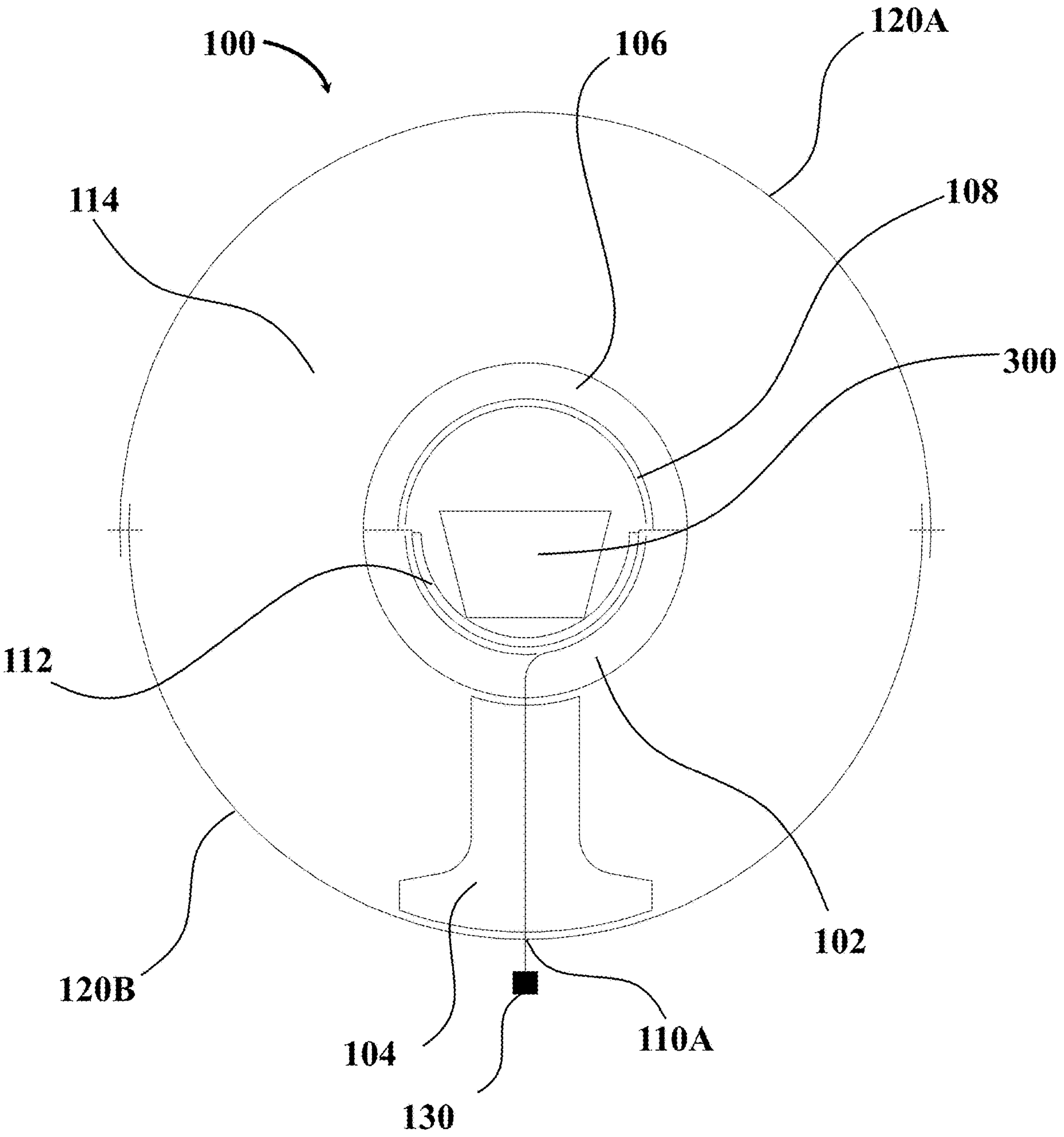
FIG. 2 is a graphical illustration depicting a front-view of a melting furnace with a charge placed within the melting furnace, according to an embodiment of the present disclosure.

As such, FIGS. 1-2 depicts a front view of melting furnace 100 having a chamber 101 located along the geometric center line of melting furnace 100. Chamber 101 is designed to support and hold a charge 300 during use of metal furnace 100. Charge 300 refers to several types of metals, metal alloys, or any material that can be heated to a molten state for further processing such as casting. In some embodiments, charge 300 comprises a pure aluminum metal bar.

As shown in FIG. 1, in some embodiments, chamber 101 comprises a top section and a bottom section wherein a half-crucible 102 is disposed along the bottom section of chamber 101. Half-crucible 102 is configured to hold and support charge 300 during the melting process. Additionally, half crucible 102 further facilitates heat transfer as well as containment of the molten metal as the molten metal travels along the length of half crucible 102 towards a discharge outlet 124 located at the front end of chamber 101 (see e.g., FIGS. 3-5).

Additionally, half-crucible 102 is shaped to conform to the bottom section of chamber 101 to provide a containment area for charge 300. As depicted in FIG. 1, half-crucible 102 takes the shape of a semi-circle meaning half-crucible 102 follows a curved profile that conforms with the bottom section of chamber 101.

While the present embodiment depicts a semi-circle outline for half-crucible 102, half-crucible 102 is not limited to this specific geometry. In some embodiments, half crucible 102 can take on different geometric shapes to conform to the shape of the bottom section of chamber 101. In this manner, half crucible 102 can take on a rectangular, elliptical, polygonal, or any other geometric form depending on the overall shape of chamber 101 to match the contours of the bottom section of chamber 101 depending on the overall need of the thermal efficiency, metal melting process, and/or metal flow desired for melting furnace 100.

In some embodiments, half-crucible 102 can be constructed from various high-temperature-resistant materials to withstand the high thermal conditions present in chamber 101 in addition to having good thermal heat conductivity. In some embodiments, half-crucible 102 is composed of castable refractory such that half-crucible 102 can withstand prolonged exposure to molten metal and extreme thermal cycling while being resistant to cracking.

Moreover, in some alternative embodiments, half-crucible 102 can be constructed from the following non-limiting examples: pre-fired ceramic, silicon carbide, graphite, porcelain, steel, or a combination thereof depending on the desired material properties for half-crucible 102 during use of melting furnace 100. The selection of material for half crucible 102 may be tailored based on operating temperature ranges, thermal shock resistance needs, material compatibility, and/or a combination thereof to optimize performance.

In some embodiments, the length of half-crucible 102 ranges from about 20 inches to about 60 inches. For example, in some embodiments, half-crucible 102 may comprise a length of about 42 inches. However, some embodiments may include a half-crucible 102 having a length beyond 20 inches.

Furthermore, half-crucible 102 may comprise of a thickness ranging from about 1 inch to about 4 inches. In some embodiments, for example, half-crucible may comprise a thickness of 2 inches. However, some embodiments may include a half-crucible 102 having a thickness beyond 4 inches.

Figure 3:
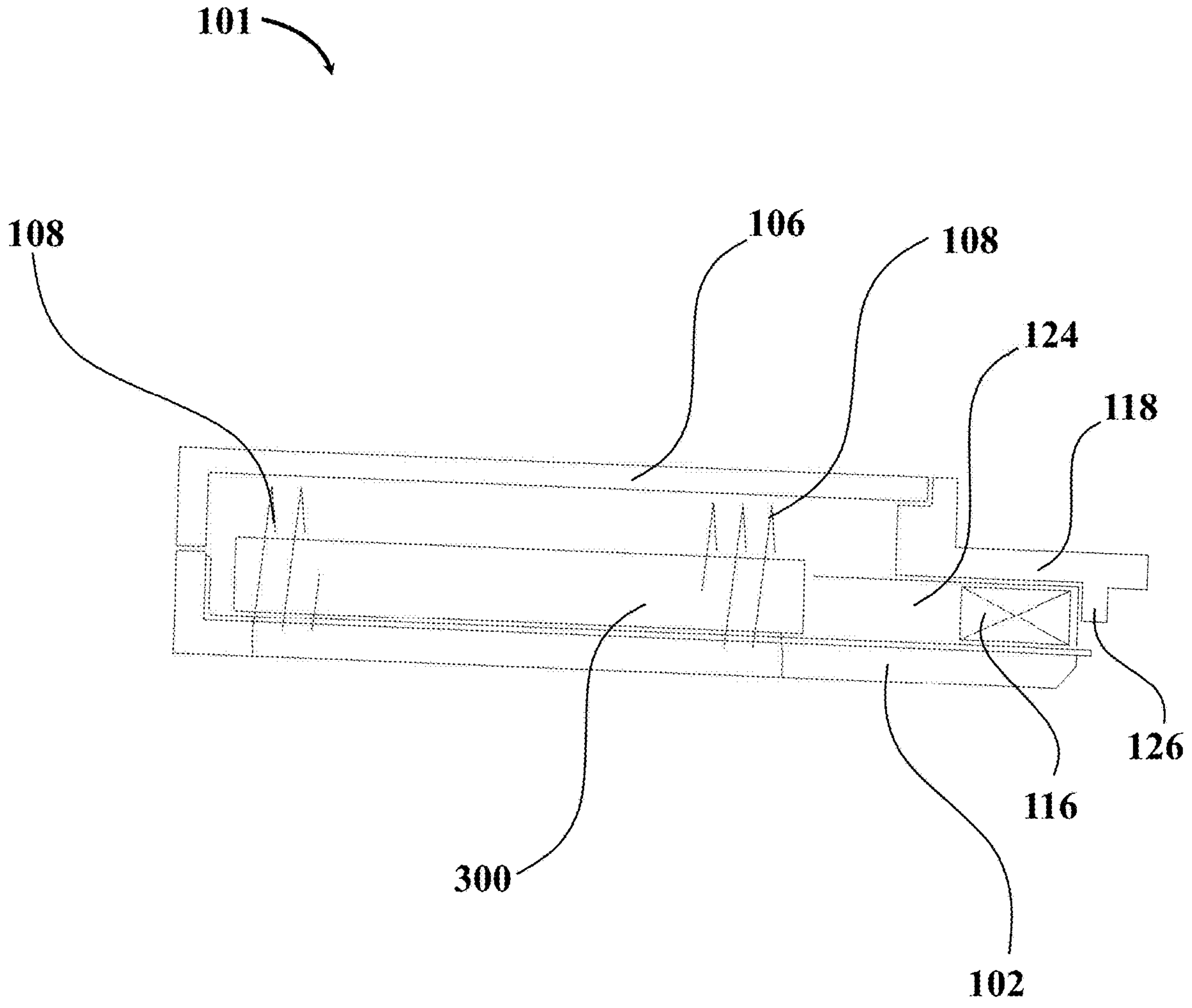
FIG. 3 is a graphical illustration depicting a side-view of a chamber composed of a half crucible and refractory cover with a charge placed within the chamber, according to an embodiment of the present disclosure.

As depicted in FIG. 1, in conjunction with FIG. 3, chamber 101 further may include a refractory cover 106 superposed onto at least a portion of half-crucible 102. As such, refractory cover 106 can extend the entire length of the top section of chamber 101.

Refractory cover 106 provides an additional layer of insulation aiding heat retention to reduce thermal loss during the melting process. Refractory cover 106 directs energy towards charge 300 while reducing energy heat loss and reducing the time required to melt charge 300. In some alternative embodiments, refractory cover 106 is optional, meaning chamber 101 is not further comprised refractory cover 106. In this manner, refractory cover 106 is not incorporated into chamber 101 such that there is no cover running along the top section of chamber 101.

Additionally, in some embodiments, chamber 101 further comprises half-crucible 102 having a liner 112 disposed along a top surface of half-crucible 102. In this manner, liner 112 is configured to provide additional insulation and structural integrity such that charge 300 and any molten metal rests only upon a top surface of liner 112 instead of half-crucible 102. Liner 112 is configured to endure the presence of molten metal on a top surface and provide a protective barrier between charge 300 and half-crucible 102.

In some embodiments, liner 112 can be removed from the top surface of half-crucible 102. In this manner, liner 112 can be removed to facilitate maintenance operations, including replacing heating element 108. Since prolonged exposure to high temperatures and operational wear may degrade heating element 108, the ability to remove liner 112 allows for easier access to half-crucible 102 and/or heating element 108. The same is true for liner 112 which experiences molten metal travel along the top surface of liner 112 during operation of melting furnace 100.

Furthermore, replacing liner 112 with a new liner after each cycle helps maintain thermal insulation and structural integrity, preventing degradation of half-crucible 102. In some embodiments, liner 112 may be secured using fasteners, clamps, or other mechanical attachment methods to allow for quick removal and reinstallation when needed.

Moreover, liner 112 is constructed from a variety of high-temperature refractory materials including, but not limited to, ceramic-based liners, graphite-based liners, silicon carbide liners, and/or a combination thereof. For ease of reference, in the exemplary embodiment, liner 112 comprises a ceramic-based liner, but this description should not be interpreted as exclusionary to other liners.

Furthermore, liner 112 comprises a thickness of about 0.02 inches to about 0.01 inches. For example, in some embodiments, liner 112 comprises a thickness of about 0.04 inches. The desired thickness and composition of liner 112 is dependent upon the need, temperature of melting furnace 100, dimensions and composition of charge 300, and/or a combination thereof.

As shown in FIG. 2, in conjunction with FIG. 3, chamber 101 comprises a heating element 108. Heating element 108 is configured such that at least one portion of heating element 108 is exposed directly to charge 300. In this manner, the direct radiant heat exposure of at least one portion of heating element 108 causes charge 300 to quickly heat up and reach a top heat temperature in a shorter amount of time than seen in other furnaces. As such, the capability of the exposed portion of heating element 108 to quickly have charge 300 reach a desired top heat significantly reduces the amount of slag formed on the top skin surface of charge 300. Accordingly, the reduced amount and/or negligible amount of slag creates a more pure and desired molten metal.

In some other embodiments, chamber 101 comprises heating element 108 configured such that at least one portion of heating element is exposed directly to charge 108 while at least one other portion of heating element 108 is embedded into half-crucible 102.

As best shown in FIG. 3, chamber 101 further includes heating element 108 designed as a wire coil-like structure where an upper portion is exposed within the top section of chamber 101. The direct exposure of the upper portion of heating element 108 ensures direct radiant heat exposure to charge 300, reducing the amount of energy required to heat and/or melt charge 300. A lower portion of heating element 108 is embedded into half-crucible 102 to ensure heating of charge 300 from all surrounding areas within chamber 101.

In some other embodiments, at least one portion of heating element 108 can be embedded into the top section of chamber 101 while at least one other portion of heating element 108 is exposed to chamber 108. Additionally, in some other embodiments, heating element 108 can comprise a series of circular heating elements spaced equidistant from each other spanning the entire length within chamber 101. In this manner, specific circular heating elements of heating element 108 can be selectively activated and deactivated depending on the desire of an operator, heating specific sections of charge 300.

In some alternative embodiments, heating element 108 comprises a series of heating elements which are linear, rectangular, spiral-shaped, and/or a combination thereof providing desired heating configurations and adapting to different chamber 101 geometries. Moreover, in other alternative embodiments, heating element 108 comprises an induction coil system allowing for contactless electromagnetic heating of charge 300, providing for rapid and efficient melting. Additionally, chamber 101 may comprise a hybrid heating element 108 comprising the various embodiments described above depending on dimension and material of charge 300.

Moreover, heating element 108 is configured to extend throughout the entirety of chamber 101 so that any length or size of charge 300 is surrounded by heating element 108. In this manner, chamber 101 is configured such that charge 300 has direct exposure to heating element 108 for one half of the diameter of chamber 101 and the other half has liner 112 that has an efficient heat conductivity.

In some embodiments, heating element 108 is comprised to operate within a temperature range of about 700° F. to about 2100° F. For example, in some embodiments, heating element 108 can be configured to operate at a temperature of 1400° F. for melting a charge 300 comprised of aluminum alloy.

In some alternative embodiments, alternative heating methods can be used to improve efficiency. Heating element 108 may be comprised of inductions coils for faster and energy-efficient melting. Alternatively, heating element 108 may incorporate infrared heating elements for localized and targeted heating applications.

As best depicted in FIGS. 1-2, melting furnace 100 may further comprise a power control system 130 operably coupled to heating element 108. Power control system 130 regulates the electrical input into heating element 108 such that power control system 130 allows for precise temperature control and adjustment of power levels if needed to maintain a constant temperature within chamber 101 to prevent overheating and/or underheating of charge 300.

Moreover, in some embodiments, power control system 130 further comprises a feedback-based control loop mechanism. For example, power control system 130 may comprise a proportional-integral-derivative controller. As such, the proportional-integral-derivative controller of power control system 130 can automatically adjust power levels to maintain a desired temperature within +5° F. of a targeted melting temperature.

Figure 4:
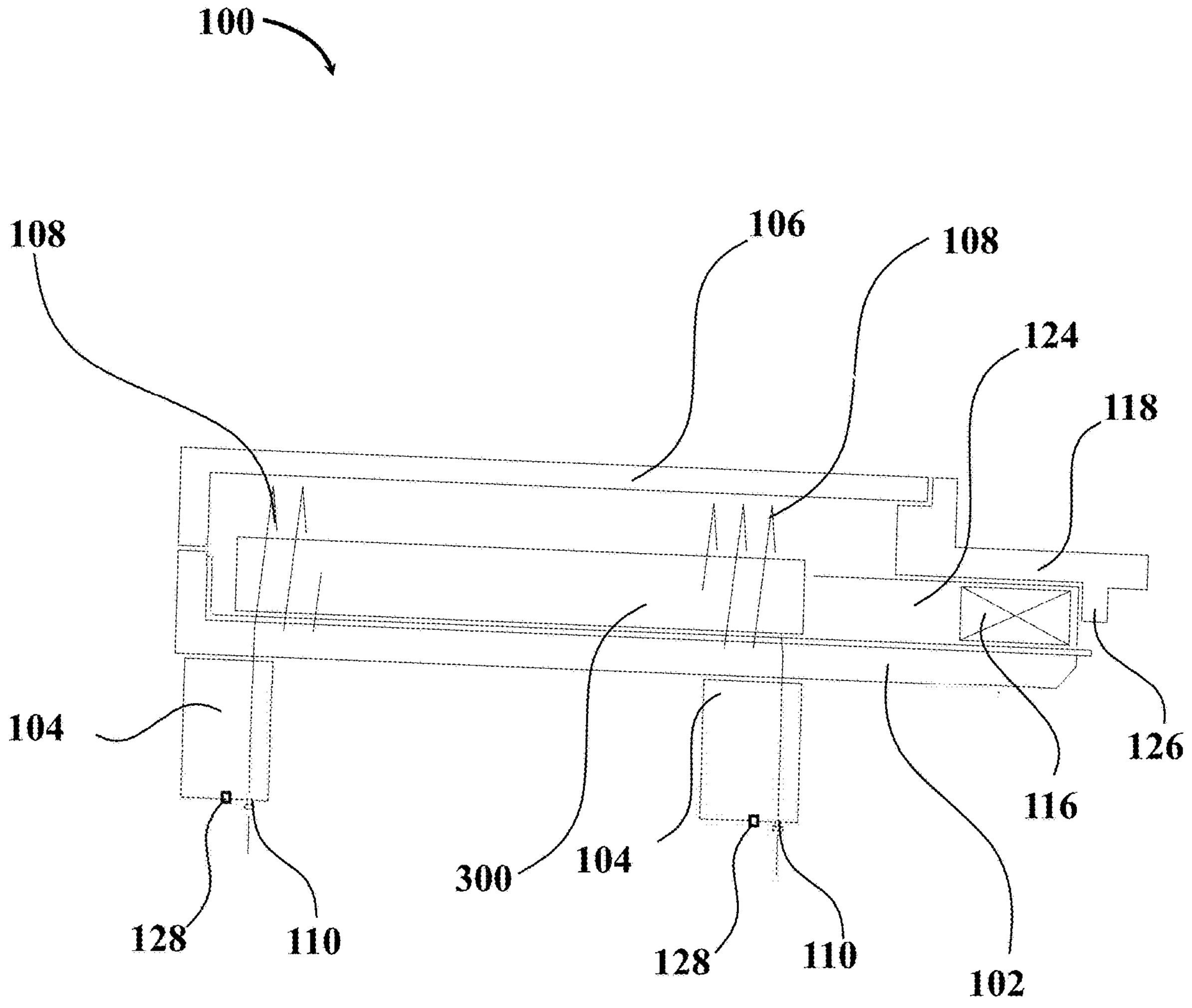
FIG. 4 is a graphical illustration depicting a side-view of a melting furnace, according to an embodiment of the present disclosure.
Figure 5:
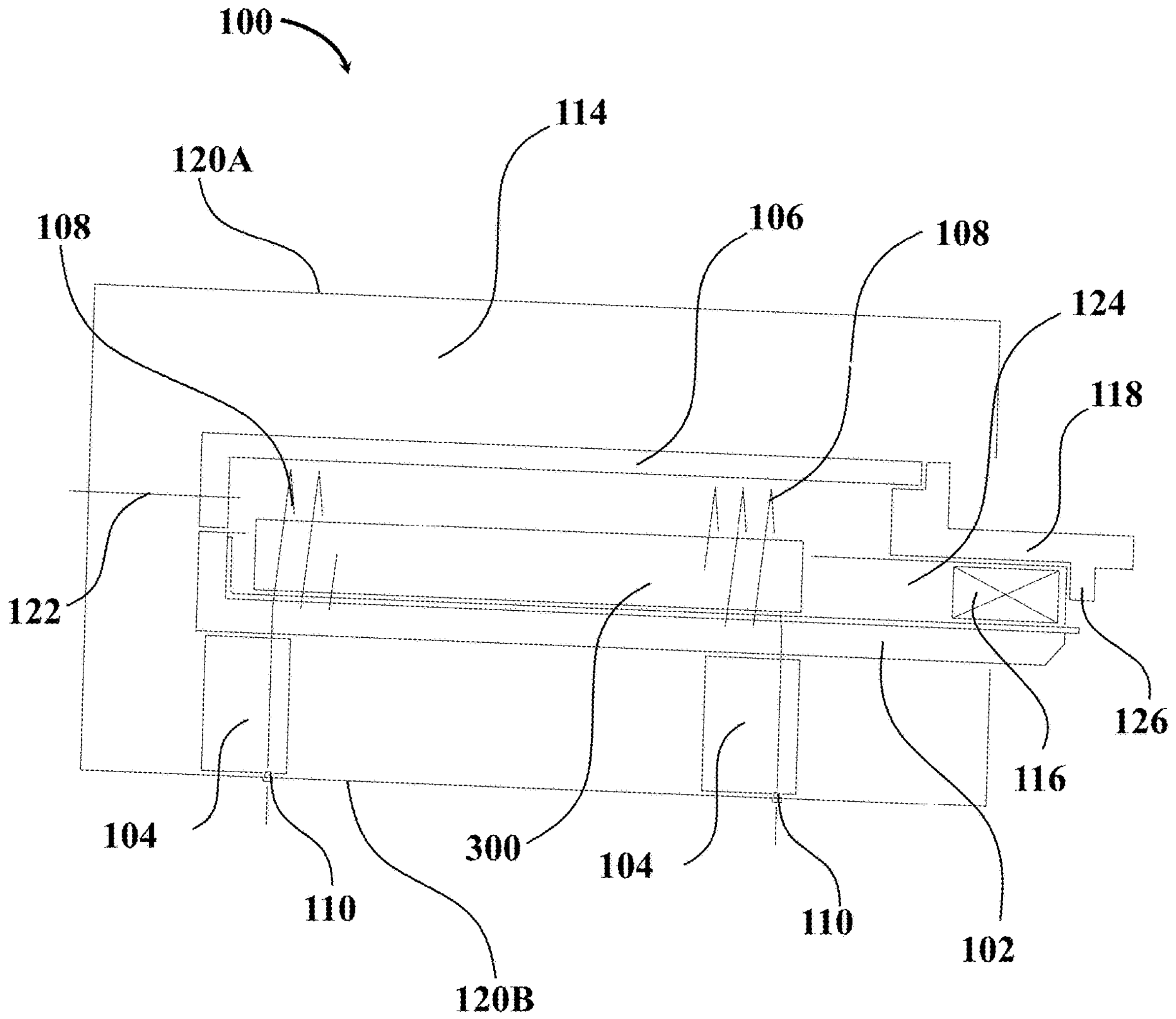
FIG. 5 is a graphical illustration depicting a side-view of a melting furnace with an insulation material and a cover encompassing the melting furnace, according to an embodiment of the present disclosure.

Referring now to FIGS. 2, in conjunction with FIGS. 4-5, chamber 101 further includes a discharge outlet 124. As shown best in FIG. 4, discharge outlet 124 is positioned at the front end of chamber 101. In some embodiments, discharge outlet 124 is the only opening of melting furnace 100 allowing for molten charge 300 to flow out of melting furnace 100 at a steady flow rate.

Moreover, discharge outlet 124 may be operably coupled to a control valve 126. In this manner, control valve 126 is configured to control the flow rate and/or exit velocity of molten charge 300 as it exits melting furnace 100. Discharge outlet 124 may further comprise an integrated slag trap. The slag trap is configured to collect any remaining slag and contaminants so that they do not mix into the pure molten metal as the molten metal exits the melting furnace 100.

Furthermore, in some alternative embodiments, discharge outlet 124 is operably coupled to a casting mold and/or a holding receptacle. In this manner, the molten metal of charge 300 is directly poured into a casting mold without coming into contact with any outside air sources which could lead to contamination and/or the creation of slag. Additionally, discharge outlet 124 being operably coupled to a casting mold and/or holding receptacle prevents further splash back of the molten metal when poured out from the melting furnace 100.

In some embodiments, control valve 126 is manually adjusted by the operator allowing for an operator to directly control the flow rate of molten charge 300 to prevent potential splash back of molten metal. In some other embodiments, control valve 126 is automated such that electronic, pneumatic, or hydraulic controls provide precise control of molten metal flow.

Furthermore, chamber 101 further comprises a filter 116 operably coupled to discharge outlet 124. Filter 116 is configured to remove impurities, build up of metal oxidation and/or slag, and prevent any other unwanted contaminants from exiting chamber 101 with the molten metal.

As shown in FIG. 3, in some embodiments, chamber 101 includes a viewing cover 118 mechanically coupled to refractory cover 106 and/or the top section of chamber 101. Viewing cover 118 having a viewing opening and/or window allows an operator to inspect the melting process without disrupting temperature stability.

Additionally, as seen in FIGS. 3 and 4, viewing cover 118 can be lifted and/or raised from a hinged position such that an operator can raise one side of viewing cover 118 to allow direct access inside the interior of chamber 101. In some other embodiments, viewing cover 118 is further removable such that an operator can remove viewing cover 118 allowing for direct access into the interior of chamber 101.

Moreover, in this manner, viewing cover 118 being removable replaces a door opening in common melting furnaces. As such, viewing cover 118 replacing a door opening can reduce the amount of heat loss that occurs during the melting process of melting furnace 100. An operator can remove viewing cover 118 to place a charge 300 and/or remove any remnant molten metal materials after a cycle of the melting process for a charge 300 within chamber 101.

In some alternative embodiments, the viewing cover 118 incorporates an insulated handle and/or a quick release locking mechanism. In this manner, an operator can safely and easily remove viewing cover 118 when the furnace is at elevated temperatures. Additionally, an elevated temperature sealing gasket may be integrated along the edges of viewing cover 118 to further reduce heat loss during a cycle of the melting process of melting furnace 100.

Furthermore, in some alternative embodiments, melting furnace 100 comprises chamber 101 having a vibration mechanism. The vibration mechanism being mechanically coupled to the bottom section of chamber 101 and/or to half-crucible 102. In this manner, the vibration mechanism prevents solidification of the molten metal during a cycle of the melting process. Moreover, the vibration mechanism allows consistent metal flow by preventing blockages.

Referring now to FIG. 2, in conjunction with FIGS. 4-5, in some embodiments, melting furnace includes one or more support legs 104. One or more support legs 104 and are mechanically coupled to at least one portion of a bottom surface of half-crucible 102. One or more support legs 104 are configured to provide structural stability and support the weight of melting furnace 100 while also enduring the thermal energy and/or heat radiating from heating element 108 during a cycle of the melting process.

Moreover, the first support leg of the one or more support legs 104 is positioned towards a rear end of chamber 101. Additionally, the final support leg of the one or more support legs 104 is positioned near the front end of chamber 101 coupled to the bottom surface of half-crucible 102 just before discharge outlet 124. All remaining support legs of the one or more support legs 104 are positioned equidistant from one another and extending in between the first leg and final support leg of one or more support legs 104.

Additionally, one or more support legs 104 are adjustable such that chamber 101 may be positioned at an inclined angle. In this manner, one or more support legs 104 can be positioned at a downward angle from a rear end of melting furnace 100 towards a front end of melting furnace 100. This downward angle facilitates improved molten metal flow of charge 300 from the center of chamber 101 towards discharge outlet 124.

In some embodiments, one or more support legs 104 can be adjusted to create a downward angle for melting furnace 100 of about 1 degree to about 20 degrees. For example, in some embodiments, the downward angle for melting furnace 100 is about 2 degrees.

As shown in FIG. 4, in some embodiments, melting furnace 100 includes one or more support legs 104 having an automated tilting mechanism 128 operably coupled to the base of one or more support legs 104. Automated tilting mechanism 128 is configured to allow for controlled tiling of chamber 101 to allow for efficient and smooth flow rate of molten charge 300. Automated tilting mechanism 128 may comprise various lifting assemblies, including but not limited to: hydraulic piston-cylinder assembly, electric linear actuator system, pneumatic tilting system, servo-motor controlled gear system, and/or a combination thereof. The provided list above is merely exemplary of lifting assemblies which automated tilting assembly mechanism 128 may incorporate and is not meant to be limiting.

Moreover, automated tiling mechanism 128 may be adjusted to suit different operational needs. In some embodiments, automated tilting mechanism 128 may be motorized, hydraulic, or pneumatically operated to enable remote or programmed control over melting furnace 100. In addition, automated tilting mechanism 128 may further comprise electric actuators for smooth and incremental tilting.

The automated tilting mechanism 128 may include pre-set tilting angles allowing an operator to select predefined position for different pouring applications. Furthermore, the tilting speed of automated tilting mechanism 128 may be adjustable creating the ability for either controlled pouring for high-precision castings or rapid tilting for bulk metal transfers.

Additionally, in some alternative embodiments, automated tiling mechanism 128 may allow for an operator to adjust the tilt using a lever, crank, or mechanical ratchet system. An operator can then incrementally adjust the angle with precision. In this manner, an operator can adjust the angle of melting furnace 100 manually allowing an operator to directly control the flow rate of the molten metal of charge 300.

In some other embodiments, automated tilting mechanism 128 is synchronized with a molten metal flow control system further comprising control valve 126 and discharge outlet 124 to regulate the flow rate of molten metal. The molten metal flow control system ensures that the flow of molten metal out of melting furnace 100 is controlled and prevents slag formation and inconsistent mold filing.

In some other embodiments, to increase the flow rate of pure molten charge 300 an operator can lift viewing cover 118 to gain access to chamber 101 during a cycle. In this manner, an operator may manually pierce the outer layer, or skin, of charge 300 to increase the flow rate of the molten charge 300. Additionally, in some other embodiments, this piercing may be achieved with a non-reactive tool or a puncturing mechanism within chamber 101. In this manner, the controlled puncturing mechanism may be mechanically coupled to a surface within chamber 101 such that the controlled puncturing mechanism can extend towards charge 300 and pierce the outer layer of charge 300 if necessary. Moreover, the controlled puncturing mechanism may be communicatively coupled to a control module.

As depicted in FIGS. 4-5, melting furnace 100 includes one or more support legs 128 each having a wire connecting point 110. Wire connecting points 110 are configured to operably couple heating element 108 to power control system 130. In some embodiments, wire connecting points 110 facilitate a direct electrical connection to power control system 130 allowing for precise voltage and current regulation through heating element 108.

Each support leg of the one or more support legs 128 have a wire connecting point 110 disposed within the support leg such that an electrical wire and/or element can be disposed throughout the one or more support legs 128 through wire connecting points 110. However, the one or more wire connecting point 110 may be located at other points instead of passing through the one or more support legs 128.

Referring now to FIG. 2, in conjunction with FIG. 5, melting furnace 100 comprises an insulation material 114. Insulation material 114 is mechanically coupled to chamber 101 such that insulation material 114 is affixed to the bottom and top sections of chamber 101. Furthermore, insulation material 114 may be affixed to a back end of chamber 101 such that only viewing cover 118 and discharge outlet 124 near the front end of chamber 101 are exposed to the environment.

Insulation material 114 is comprised of materials with desired levels of thermal containment properties which significantly reduce heat loss and improve energy efficiency. Materials which insulation material 114 may be composed of include but are not limited to ceramic fiber, refractory brick, castable insulation, vacuum-insulated panels, aerogel insulation, graphic insulation, and/or a combination thereof. For example, in some embodiments, insulation material 114 may be composed of ceramic fiber, but this description should not be interpreted as exclusionary to other insulation materials.

As shown in FIG. 2, in conjunction with FIG. 5, some embodiments of melting furnace 100 includes covers 120A and 120B. Covers 120A and 120B are disposed about the outer surface of insulation material 114 such that covers 120A and 120B are overlaid over insulation material 114.

In this manner, cover 120A is configured to encase one half of melting furnace 100. In some embodiments, the half encased by cover 120A corresponds to the top section of chamber 101. Additionally, cover 120B is configured to encase the other half of melting furnace 100. In some embodiments, the half encased by cover 120B corresponds to the bottom section of chamber 101.

Additionally, covers 120A and 120B act as an external protective enclosure to provide mechanical protection, heat containment, and shielding from environmental factors. The inclusion of covers 120A and 120B protects chamber 101 and insulation materials 114 from exposure to the outside environment, giving melting furnace 100 a longer lifetime.

Moreover, covers 120A and 120B are mechanically coupled to each other along the plane of the center line of melting furnace 100. Cover 120A overhangs over the top section of melting furnace 100, whereas cover 120B surrounds the bottom section of melting furnace 100. Covers 120A and 120B are mechanically coupled by a series of mechanisms, such as clamps or latches, interlocking the two covers together around insulation material 114. As such, covers 120A and/or 120B are modular meaning one cover can be removed from melting furnace 100 while the other cover remains in position.

In some embodiments, covers 120A and 120B are constructed form durable and heat-resistant materials including, but not limited to, stainless steel, aluminum alloys, refractory-coated panels, tin, composite metal panels, and/or a combination thereof. For example, in some embodiments, covers 120A and 120B may be composed of tin, but this description should not be interpreted as exclusionary to other insulation materials.

Referring now to FIG. 5, melting furnace 100 comprises a thermocouple 122. In the exemplary embodiment, thermocouple 122 is disclosed as the temperature detecting component within melting furnace 100. However, it should be understood that 122 is not limited solely to thermocouples but may also encompass other temperature detecting sensors capable of providing real-time temperature readings. Such sensors may include, but are not limited to, resistance temperature detectors, infrared temperature sensors, thermistors, and/or a combination thereof as well as other temperature sensors known in the art. The following description details the configuration and functionality of thermocouple 122 while also recognizing that alternative temperature sensing technologies may be utilized in other embodiments.

As depicted, thermocouple 122 extends from within chamber 101 through refractory cover 106, insulation material 114, and covers 120A and/or 120B outward to the surrounding environment. Thermocouple 122 operates on a thermoelectric principle where two dissimilar metal wires generate voltage proportional to the temperature difference at a junction wherein this voltage is transmitted and provides real-time temperature readings.

In this manner, thermocouple 122 provides real-time temperature readings of the inside of chamber 101 such that an operator can read the provided temperature reading of thermocouple 122 and adjust the temperature of heating element 108 accordingly. In some embodiments, thermocouple 122 is calibrated to withstand extreme temperatures such that thermocouple 122 can operate in maximum temperatures ranging from about 700° F. to about 2100° F.

In some embodiments, melting furnace 100 comprises of a length ranging from about 24 inches to about 96 inches. In an exemplary embodiment, the length of melting furnace 100 comprises a length of about 48 inches. Furthermore, in some embodiments, melting furnace 100 may comprise a diameter ranging from about 11 inches to about 44 inches. For example, in some embodiments, the diameter of melting furnace 100 is 22 inches.

In some embodiments, melting furnace 100 further comprises a control module. The control module is communicatively coupled to power control system 130, thermocouple 122, automated tilting mechanism 128, heating element 108, control valve 126, and/or any other integrated features of melting furnace 100. The control module may function as a central processing unit such that the control module receives real-time data and executes programmed instructions.

The control module can receive temperature data from thermocouple 122 and adjust for the temperature fluctuations by adjusting the power input by power control system 130 to heating element 108. Additionally, the control module can determine the flow rate of the molten metal and adjust the angle of melting furnace 100 to maintain a desired flow rate. In this manner, the control module can control and/or operably communicate with automated tilting mechanism 128 and control valve 126.

Furthermore, in some embodiments, the control module may be remotely operated by an operator. In this manner, the control module may be wirelessly connected to power control system 130, thermocouple 122, automated tilting mechanism 128, heating element 108, control valve 126, and/or any other integrated features of melting furnace 100.

As such, the control module may comprise of software, or an app located on an external computing device, such as a cellphone device and/or laptop, a distance from melting furnace 100. An operator may view the control module and adjust the desired flow rate, angle, or any other feature of melting furnace 100 and/or an operator can set a desired flow rate which the control module can maintain.

In some embodiments, melting furnace 100 further comprises at least one ventilation chamber. The at least one ventilation chamber may comprise an opening extending from chamber 101 to an outer surface of cover 120A and/or 120B. The at least one ventilation chamber may be configured such that excess gas can be released from within chamber 101 to provide efficient heat transfer and further minimize formation of slag and/or oxidation of charge 300.

Method of Use

Figure 6:
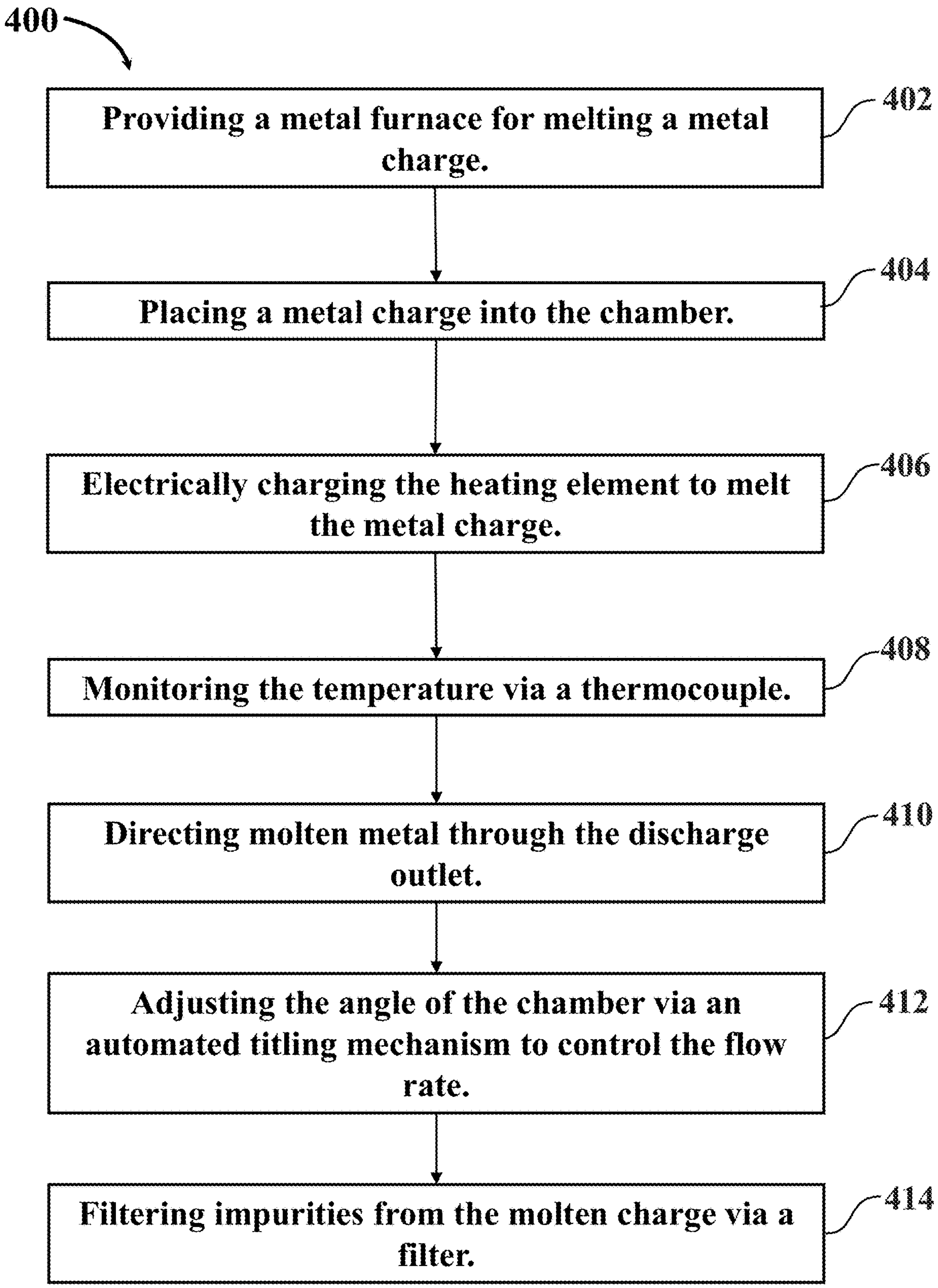
FIG. 6 is a flow chart depicting the steps of a method of melting a metal charge, according to an embodiment of the present disclosure.

Referring now to FIG. 6, a method 400 is depicted for melting a metal charge 300 via melting furnace 100. The steps delineated are merely exemplary of a preferred order for melting a metal charge 300. The steps may be carried out in another order, with or without additional steps included therein. Additionally, the steps may be carried out with the various embodiments for melting furnace 100, as contemplated in the above description.

As shown in FIG. 6, the method 400 for melting a metal charge 300, via melting furnace 100, begins with step 402, providing a metal furnace for melting a metal charge 300. The next step, step 404, comprises placing a metal charge 300 into the chamber 101. Moreover, charge 300 comprises of a metal alloy or pure metal bar.

At step 406, the heating element is electrically charged, causing the metal charge 300 to melt. At step 408, the temperature from within chamber 101 is monitored via the thermocouple 122. In some embodiments, the temperature from within chamber 101 is monitored continuously at the moment heating element is electrically charged.

Referring again to FIG. 6, next, method 400 may proceed to step 410. At step 410, charge 300 has begun to melt and create molten metal. The molten metal is then directed from within chamber 101 to discharge outlet 124. Then, at step 412, the downward angle of chamber 101 can be adjusted to achieve a desired flow rate via automated tilting mechanism 128. Finally, at step 412, any impurities within the molten metal are filtered by filter 116 ensuring only pure molten metal is poured into an outside casting mold and/or retainer from chamber 101.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A melting furnace comprising:

a. a chamber having a top section and a bottom section, the chamber comprising:
   i. a half crucible;
   ii. a refractory cover superposed on at least one portion of the half crucible;
   iii. a liner disposed along the top surface of the half crucible;
   iv. an electrical heating element, wherein at least one portion of the electrical heating element is exposed;
   v. a discharge outlet at the front end of the chamber;
   vi. a filter operably coupled to the top and bottom sections of the chamber, positioned between a charge within the chamber and the discharge outlet; and
   vii. a viewing cover disposed above the filter and operably coupled to the top section of the chamber;

b. one or more support legs mechanically coupled to the half crucible;

c. an insulation material affixed to the top and bottom sections of the chamber;

d. a cover overlaid over an outer surface of the insulation material; and e. a temperature sensor extending from within the chamber through the refractory cover, insulation layer, and cover.

2. The melting furnace of claim 1, wherein the discharge outlet is operably coupled to an external casting system.

3. The melting furnace of claim 1, further comprises a flow control valve operably coupled to the discharge outlet.

4. The melting furnace of claim 1, further comprises a power control system operably connected to the heating element wherein the power control system regulates the electrical input.

5. The melting furnace of claim 1, wherein the one or more support legs are adjustable wherein the at least one of the one or more legs can be raised to a greater height than at least one other of the one or more legs thereby creating an angle between the one or more legs.

6. The melting furnace of claim 5, further comprises an automated tilting mechanism operably coupled to the one or more support legs whereby the angle of the chamber is adjusted to control the flow of molten metal through discharge outlet.

7. The melting furnace of claim 5, wherein the angle between the one or more legs comprises an angle of at least 0.5 degrees.

8. A method of melting a metal charge, the method comprising:

providing a metal furnace for melting a metal charge, the metal furnace comprising:
   a chamber having a top section and a bottom section, the chamber comprising:
      a half crucible;
      a refractory cover superposed on at least one portion of the half crucible;
      a liner disposed along the top surface of the half crucible;
      a heating element wherein at least one portion of the heating element is exposed and at least one portion of the heating element is embedded within the half crucible;
      a discharge outlet at the front end of the chamber;
      a filter operably coupled to the top and bottom sections of the chamber, positioned between a charge within the chamber and the discharge outlet; and a viewing cover disposed above the filter and operably coupled to the top section of the chamber;
an insulation material affixed to the top and bottom sections of the chamber;
a cover overlaid over an outer surface of the insulation material;
a temperature sensor extending from within the chamber through the refractory cover, insulation layer, and cover; and
one or more support legs mechanically coupled to the half crucible;
placing a metal charge on a top surface of the half crucible within the chamber;
electrically charging the heating element to melt the metal charge; and
directing molten metal through the discharge outlet.

9. The method of claim 8, further comprises the step of, monitoring the temperature within the chamber via the temperature sensor.

10. The method of claim 8, further comprises the step of, filtering impurities from the molten metal charge via a filter positioned between the charge and the discharge outlet.

11. The method of claim 8, further comprises the step of, adjusting the angle of the chamber via an automated tilting mechanism.

* * * * *